(12) United States Patent
Betz

(10) Patent No.: US 9,188,658 B2
(45) Date of Patent: Nov. 17, 2015

(54) AUTOMATICALLY ADJUSTING LIGHT SHELF AND METHOD OF USE

(71) Applicant: Trevor Scott Betz, Ann Arbor, MI (US)

(72) Inventor: Trevor Scott Betz, Ann Arbor, MI (US)

(*) Notice: Subject to any disclaimer, the term of this patent is extended or adjusted under 35 U.S.C. 154(b) by 155 days.

(21) Appl. No.: 13/745,779

(22) Filed: Jan. 19, 2013

(65) Prior Publication Data

US 2014/0203166 A1 Jul. 24, 2014

(51) Int. Cl.
*F24J 2/02* (2006.01)
*G01S 3/784* (2006.01)
*F24J 2/38* (2014.01)
*F21S 11/00* (2006.01)
*F24J 2/06* (2006.01)

(52) U.S. Cl.
CPC ............... *G01S 3/784* (2013.01); *F21S 11/007* (2013.01); *F24J 2/02* (2013.01); *F24J 2/38* (2013.01); *F24J 2/06* (2013.01); *H02S 20/32* (2014.12)

(58) Field of Classification Search
USPC ............... 250/201.1–201.3, 203.1–203.4; 359/592, 596, 597; 126/574–575
See application file for complete search history.

(56) References Cited

U.S. PATENT DOCUMENTS

| | | | |
|---|---|---|---|
| 4,013,885 A | | 3/1977 | Blitz |
| 4,225,781 A | * | 9/1980 | Hammons ............... 250/203.4 |
| 4,349,733 A | | 9/1982 | Beam |
| 5,493,824 A | * | 2/1996 | Webster et al. ............. 52/200 |
| 5,517,358 A | * | 5/1996 | Dominguez ............... 359/592 |
| 6,988,525 B2 | | 1/2006 | Moulton |
| 7,417,397 B2 | | 8/2008 | Berman |
| 8,116,004 B2 | | 2/2012 | Griffiths |
| 2007/0297058 A1 | * | 12/2007 | Briee et al. ............... 359/597 |
| 2009/0084431 A1 | * | 4/2009 | Briee et al. ............... 136/246 |
| 2010/0254011 A1 | * | 10/2010 | Griffiths ................. 359/597 |

OTHER PUBLICATIONS

U.S. Appl. No. 12/421,967, filed Oct. 14, 2010, Hyatt, pp. 1, 16, 17.

* cited by examiner

*Primary Examiner* — Francis M Legasse, Jr.
(74) *Attorney, Agent, or Firm* — MU Patents; Timothy Marc Shropshire; Garrett James O'Sullivan

(57) ABSTRACT

An automatically adjusting light shelf has a circuit of components used to measure light levels within a space; a light shelf hinged to a window assembly, used to reflect light entering the space; and a rotation device used to alter the light entering the space by rotating the light shelf. The light levels are measured using light sensors having a capacitive component and phototransistor in parallel with one another, a microcontroller, and optionally, a clock. The automatic operation of the light shelf can be overridden for manual operation. A method of using the automatically adjusting light shelf includes the steps of measuring a differential between the light levels reaching the light sensors; determining a direction to rotate the light shelf to alter the light; and rotating the light shelf so that the reflected light is optimized within the space.

17 Claims, 4 Drawing Sheets

AUTOMATICALLY ADJUSTING LIGHT SHELF AND METHOD OF USE

CROSS-REFERENCE TO RELATED APPLICATIONS

BACKGROUND

Prior-Art

The following is a tabulation of some prior art that presently appears relevant:

U.S. Patents

| Pat. No. | Kind Code | Issue Date | Patentee |
| --- | --- | --- | --- |
| 4,013,885 | A1 | 1977-03-22 | Blitz, D |
| 4,225,781 | A1 | 1980-09-30 | Hammones, B |
| 4,349,733 | A1 | 1982-09-14 | Beam, B |
| 6,988,525 | A1 | 2004-12-23 | Moulton, P |
| 7,417,397 | A1 | 2009-01-22 | Berman, J |
| 8,116,004 | A1 | 2010-10-07 | Griffiths, R |
| 12/421,967 | A1 | 2010-10-14 | Hyatt, L |

As world populations grow and put a greater strain on the availability of resources there is an increasingly focused effort on sustainable, energy efficient designs, particularly when it comes to architecture, as buildings are the single largest user of energy within the United States. Although the specific energy profile of a building depends largely on its particular use, space lighting consistently ranks within the top slots of energy expenditure. While lighting technology continues to advance and produce more efficient means of artificial lighting, no fixture will ever be able to overtake the innate sustainable features of properly exploited natural light within a structure.

One area of lighting design that has been able to effectively exploit natural daylight is the use of light shelves. A light shelf is essentially a horizontal opaque surface mounted to a window frame, where a portion of the window glazing extends above the light shelf. The diffuse or specular surface of the light shelf effectively reflects the sunlight to the upper regions of the room. If the ceiling is designed with a sufficient reflectivity, the light is then redirected to the workspace as free area lighting, whereas a design without light shelves would have the sunlight instead absorbed by the carpet. By combining the window fenestration with a shading element below the light shelf, free daylighting can be harvested while still avoiding unnecessary glare.

Some of the current designs, such as U.S. Pat. No. 8,116,004 by Griffiths R. T., approach the manufacturability and design deficiencies as a means to broaden the use of light shelves. Such designs do address the manufactured surface of the light shelf as a means of controlling the availability of light, but do little to have any automatic control as a means of compensating for differing lighting conditions.

One of the drawbacks of light shelves is their inability to adjust to differing lighting conditions to maximize their effect. In the mid to extreme latitudes, the sun's angle to the horizon changes throughout the seasons which can affect how the light is reflected into the space. For example, in the winter when the sun is at a low relative angle, the daylight would be reflected at a relatively small angle of incidence having the effect of the daylighting maximized deep within the space. Conversely, in the summer when the sun is at a high angle, most of the light would be reflected to an area near the window leaving the interior spaces with less than optimal daylighting.

There have been some attempts to remedy this effect on a light shelf. U.S. Pat. No. 6,988,525 by Mouton P., explains an adjustable light shelf design. However, there are no automatic controls present in this apparatus. Whenever it is left to an occupant to manually adjust an apparatus, the operation typically deviates from the optimum as the person may not always be cognizant of the need to adjust the device, and furthermore, may not be able to take time away from the present task to do so. This invariably lends itself to sub-optimal operation and often means the apparatus is left in a more disadvantageous position than if the adjustment option was excluded. There are methods of automatic shade controls, such as U.S. Pat. No. 7,417,397 by Berman et. Al., but this is not intended for use with light shelves. While this patent uses sensors and a controller, its aim is to provide shade position to facilitate a desired light level within the space. Since it is not used with light shelves, the direction of the light entering the space is not controlled into the most advantageous spot to be used by the workspace. This can lead to various lighting conditions throughout the sun's position, which may lead to artificial lighting being used even when there is sufficient daylighting available. In fact, many audits show that occupants will unwittingly subject themselves to overlit conditions in order to even out the lighting throughout the space. There are some light shelf devices, such as the one detailed by U.S. Pat. No. 8,116,004 by Griffiths, that details a light shelf system but does not have an adequate means of automatically orienting the device for the preferred lighting condition. Other designs, such as U.S. patent application Ser. No. 12/421,967 by Hyatt, feature adjustable light shelves but they are manual designs specified to simply enhance the robustness of the shelf and not for optimizing interior lighting.

There are other devices not specifically used for light shelves that have reorienting methods that respond to sunlight but are not particularly well suited to light shelf applications. U.S. Pat. No. 4,013,885 by Blitz is a sun tracker that uses an imaging tracker located directly behind the collecting device that would be awkwardly placed within the living space if used in a light shelf application. U.S. Pat. No. 4,225,781 by Hammonds uses a pyramid-shaped array of sensors that would not work well for a light shelf application, which necessitates the sensors being on the same plane such as on a ceiling in the preferred embodiment. U.S. Pat. No. 4,349,733 by Beam details a sun tracker that uses a means of orientation that seeks uniformly illuminated photo sensors, while the differential method used in this device makes it easier to orient the device to maximize light in the most advantageous point in the space by placing the central sensor where the maximum light point is desired, as opposed to manipulating all of the sensor locations so that they are equally illuminated when the light is in the proper placement. None of the above devices in this paragraph utilizes a clock function to determine preferred no operating times, nor do they apply to light shelves.

Other embodiments could be useful for other purposes than architectural space lighting. This could include any apparatus that requires directed daylight on a specific point regardless of source orientation to the reflective surface. An example could be a solar thermal application where the light is required to be continuously focused on a specific area that needs heating, or a solar application where reflected light is used by photovoltaic cells to produce electricity.

SUMMARY

In accordance with one embodiment, an automatically adjusting light shelf comprises of a light shelf, a plurality of light sensors, an astronomical clock, a servomotor, an override switch, and a microcontroller.

Accordingly, several advantages of one or more aspects are as follows: to provide an automatically adjusting light shelf, that uses a plurality of light shelves to communicate with a servomotor via a microcontroller to find the best rotational angle of the light shelf as a means of optimizing the placement of the light reflected off of the light shelf surface, an astronomical clock that utilizes an algorithm to determine the optimal operating times, and a switch that will allow an end-user the option to override predetermined operation. Other advantages of one or more aspects will be apparent from a consideration of the drawings and ensuing description.

DRAWINGS

Figures

Figure 1:
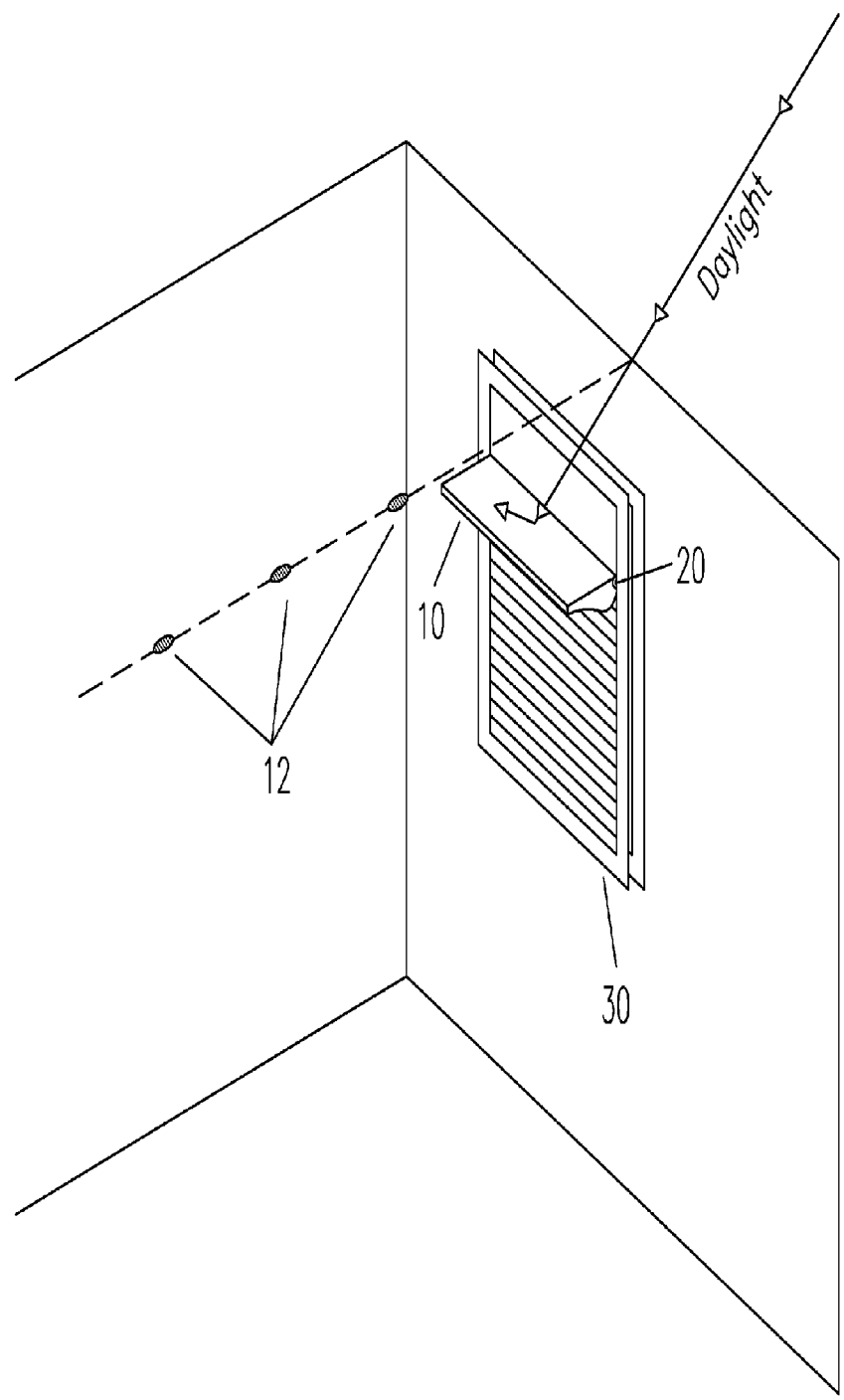
FIG. 1 shows the light shelf system, according to an embodiment of the present invention.

The sequence listing shows one embodiment of a program for the microcontroller to run the system using PBASIC programming language. A portion of this particular embodiment uses a segment of code from the Parallax Corporation for use with their DS1302 clock component module.

| Drawings-Reference Numerals | |
|---|---|
| 10 light shelf | 12 light sensors |
| 14 clock | 16 timing crystal |
| 18 servomotor | 20 hinge |
| 22 power source | 24 microcontroller |
| 26 resistor | 26 phototransistor |
| 28 capacitor | 30 window assembly |
| 32 switch | |

DETAILED DESCRIPTION

FIGS. 1, 2, 3, and 4

One embodiment of the apparatus is illustrated in FIG. 1. A light shelf 10 is mounted to the window assembly 30 so that light is reflected off the light shelf 10 into the adjacent space. In the embodiment shown, a plurality of light sensors 12 are placed in an orientation in the same direction at which the light shelf 12 juts into the space. A servomotor 18 is attached to the hinge 20 of the light shelf 12.

Figure 2:
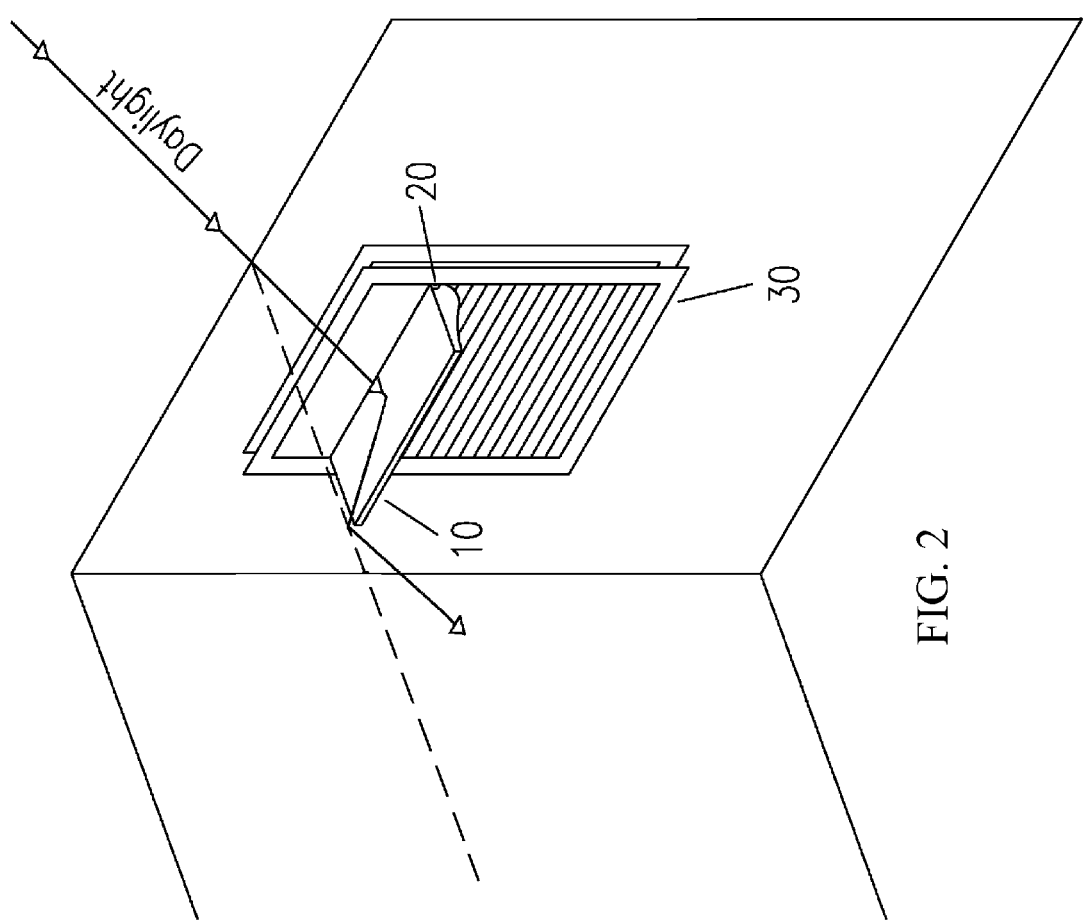
FIG. 2 shows the light shelf system, according to an embodiment of the present invention.

In an alternative embodiment, as shown in FIG. 2, the light shelf 10 directs the light entering the space to a surface in an upper region of the space having a reflective quality. The reflective quality of the surface in the upper region of the space then re-directs the light to a location within the space.

Figure 3:
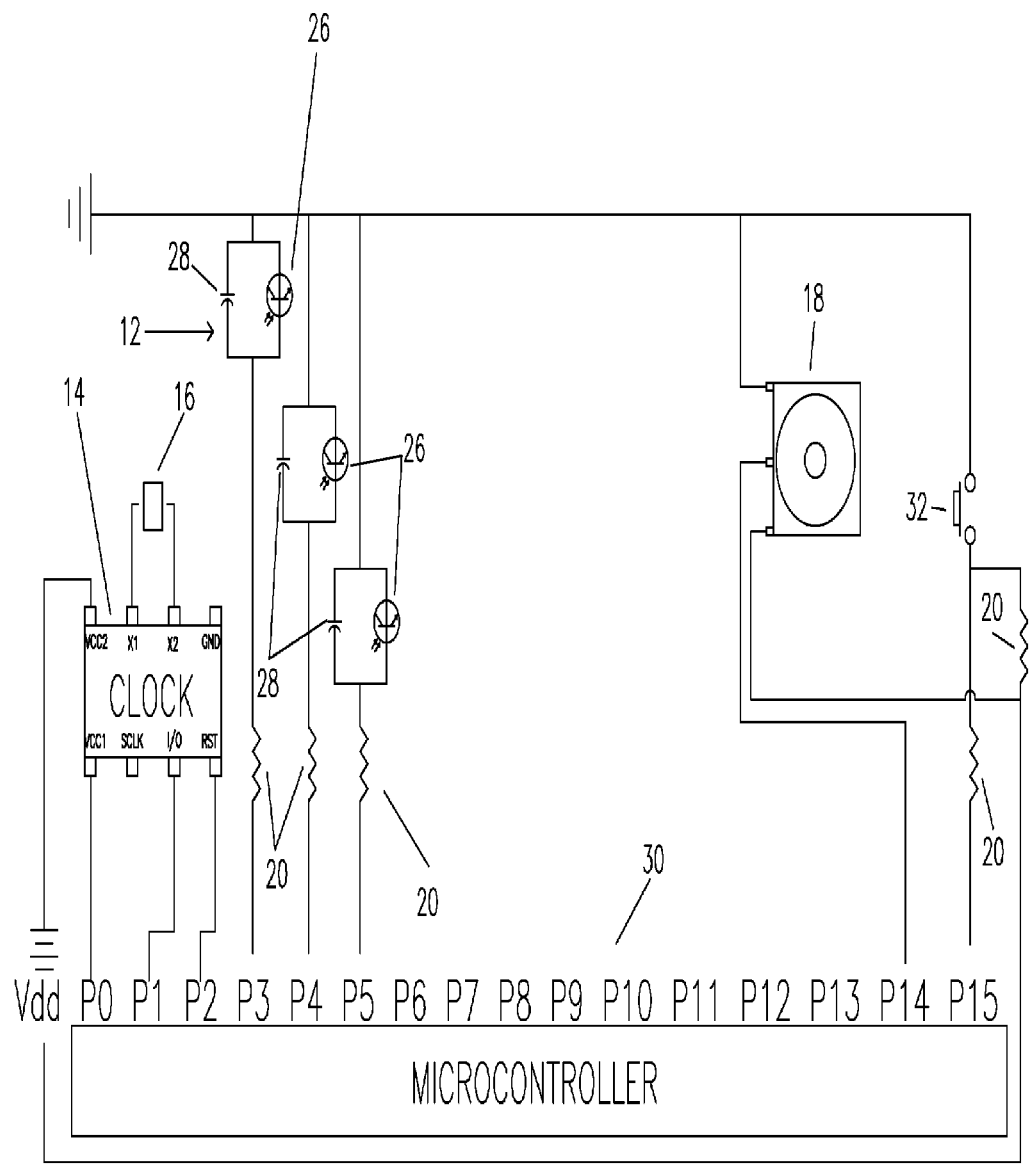
FIG. 3 shows an electrical schematic of the light shelf system having three light sensors, a clock, and an override switch, according to an embodiment of the present invention.
Figure 4:
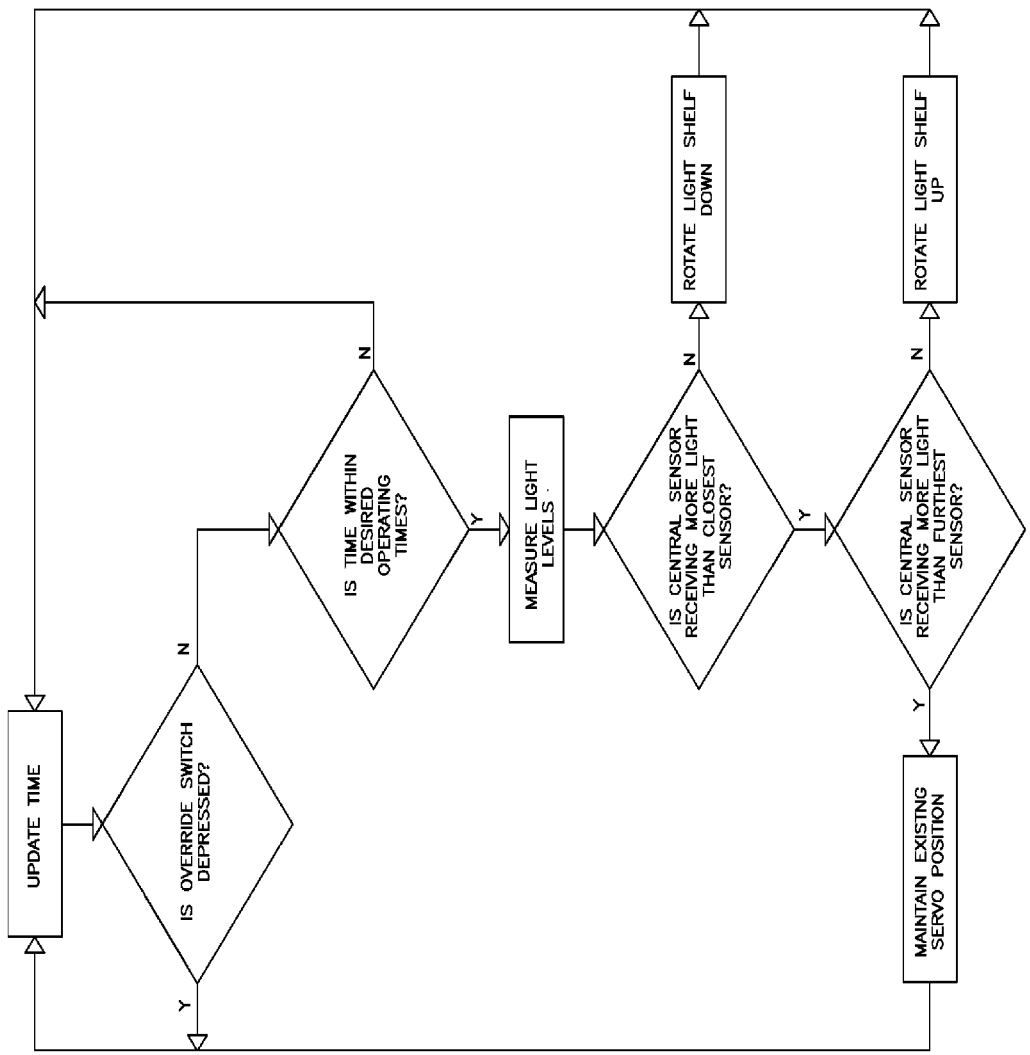
FIG. 4 shows a flow diagram for the microcontroller sequence of operations, according to an embodiment of the present invention.

FIG. 3 shows an electrical schematic of one embodiment. The microcontroller 24 contains 16 pin locations labeled P0-P15. Other embodiments can be arranged with different configurations and the pin connections in this particular embodiment are arbitrary. As such, other embodiments can use alternate component arrangements.

A clock 14 utilizes P0, P1, and P2 for operation. The clock 14 is attached to a timing crystal 16 to keep proper time after the initial time parameters are programmed. P3, P4, and P5 are each connected to the light sensors 12 in series with a resistor 26. In this embodiment, light sensors 12 comprise of a phototransistor 34 connected in parallel to a capacitor 36. However, other embodiments can use other means of light sensing and measurement. The microcontroller 24 is also connected to the servomotor 18 which drives the hinge 20 of the light shelf in this embodiment, facilitating rotation of the light shelf 10 about the axis of the hinge 20. A switch 32 is connected to the microcontroller 24 which allows for user override functionality in this embodiment. A power source 22 is connected to the microcontroller 24 to facilitate operation.

Additional Embodiments

There are a number of alternate arrangements of light sensors 12 that would be capable of performing the necessary light differential readings. Other embodiments could use ambient sensors to determine operational times, either in lieu or in conjunction with the clock 14. Some embodiments may omit the clock 14 altogether, depended on the desired operation. It may be desirable to have an embodiment with an alarm function to denote when the system is not operating in the most advantageous manner. Other embodiments are capable of performing the same necessary functions of the basic system operation.

Operation—FIGS. 1, 2, 3, and 4

The operation of the automatically adjusting light shelf begins with the appropriate time being programmed into the microcontroller 24. After this point, the clock 14 will automatically track the current time and continuously update. Once the system has determined that the current time is within the desired operational time periods, it will measure the light levels being reflected off of the light shelf 10 onto the light sensors 12.

Most embodiments will have a predetermined light sensor 12 placed in a location that optimizes the light within the space. It may be in the center of the room to maximize the light throughout the area or it may be placed strategically over an area that needs additional task lighting. The microcontroller 24 will measure the light levels on the individual light sensors 12 and determine which way the servomotor 18 should rotate in order optimize the desired lighting characteristics. As the servomotor 18 rotates, it causes the light shelf 10 to adjust about its hinge 20 that then optimizes the way that the light is reflected into the space. The light shelf 10 will continue to operate in this manner, measuring light levels and adjusting the reflected light at predetermined intervals until the time registered is no longer within the desired operating time periods.

ADVANTAGES

From the description above, a number of advantages from one or more aspects of various embodiments of the photoresponsive automatic solar panel cleaner become evident:

(a) The light shelf has a hinge assembly that allows it to be rotated to the most advantageous orientation for use.

(b) The use of measuring different intensities of incident light striking the light sensing elements in the embodiment allows the light shelf to be placed in a quantifiably optimized orientation.

(c) The use of a microcontroller, in conjunction with a servomotor and light sensing elements allows for the position of the light shelf to be adjusted continuously without direct user interface.

(d) The availability of a switch override in this embodiment allows for the user to manually adjust the light shelf position in the event that the desired position differs from the programmed optimized location.

(e) The use of a clock within this embodiment allows for the operational times to be optimized so that the light shelf does not operate unnecessarily during times when additional light is not needed, thus saving energy.

The embodiment in FIG. 3 shows each of the light sensors as a resistive-capacity circuit, the clock assembly, and the servomotor assembly. The sequence listing shows an embodiment of a program written in PBASIC that uses a table lookup function in conjunction with the clock to cause the light shelf to operate only during the times between sunrise and sunset, so as to avoid operation due to night lighting. Algorithms could alternatively be programmed for different operational time schemes, such as only operating during specified work schedules of the occupants.

CONCLUSIONS, RAMIFICATIONS, AND SCOPE

Accordingly, the reader will see that the automatically adjusting light shelf can be used as a means to optimize the natural daylighting within a space, leading to increased occupant comfort and productivity as well as decreased energy usage. Using light sensors to detect the current lighting conditions, the differential light measurements between the light sensors is used to determine the best orientation of the light shelf, which is rotated about a hinge to place the daylighting where it is most needed within the space.

Although the description above contains specific descriptions, these should not be interpreted as limiting the scope of the embodiments but merely as a way of providing illustrations of possible embodiments. For example, more than three light sensors can be used, or alternate methods of light sensing can be employed. Thus the scope of the embodiments should be determined by the appended claims and their appropriate legal equivalents, rather than the specific representations previously defined. The following is one embodiment of a control sequence written in PBASIC language.

```
1  ' {$STAMP BS2}
2  ' {$PBASIC 2.5}
3
4  time1            VAR    Word
5  time2            VAR    Word
6  time3            VAR    Word
7  Light_Threshold  CON    20000
8  Diff1            VAR    Word    'measures different light
9                                  'levels between center and
10                                 'right sensor
11 Diff2            VAR    Word    'measures different light
12                                 'levels between center and
13                                 'left sensor
14 position         VAR    Word
15 counter          VAR    Word
16 time_limit       CON    10      'sets length of time between
17                                 'cycles in minutes
18 Sunrise          VAR    Word
19 Sunset           VAR    Word
20 Time             VAR    Word
21 'Define I/O pins and RTC variables
22 Clk CON 0
23 Dta CON 1
24 RTCCS CON 2
25 RTCCmd VAR Byte
26 Value VAR Byte
27 Seconds VAR Byte
28 Minutes VAR Byte
29 Hours VAR Byte
30 Date VAR Byte
31 Month VAR Byte
32 Day VAR Byte
33 Year VAR Byte
34 Idx VAR Byte
35 'Define RTC Command Constants
36 SecReg CON %00000
37 MinReg CON %00001
38 HrsReg CON %00010
39 DateReg CON %00011
40 MonReg CON %00100
41 DayReg CON %00101
42 YrReg CON %00110
43 CtrlReg CON %00111
44 TChgReg CON %01000
45 BrstReg CON %11111
46 'Define Days-Of-Week, Months and AM/PM text.
47 'All text is stored in EEPROM with a binary 0
48 'as the ENd-of-text character
49 Sun DATA "Sun",0
50 Mon DATA "Mon",0
51 Tue DATA "Tues",0
52 Wed DATA "Wednes",0
53 Thu DATA "Thurs",0
```

```
54  Fri DATA "Fri",0
55  Sat DATA "Satur",0
56  Jan DATA "January",0
57  Feb DATA "February",0
58  Mar DATA "March",0
59  Apr DATA "April",0
60  May DATA "May",0
61  Jun DATA "June",0
62  Jul DATA "July",0
63  Aug DATA "August",0
64  Sep DATA "September",0
65  Oct DATA "October",0
66  Nov DATA "November",0
67  Dcm DATA "December",0
68  AM DATA " AM",0
69  PM DATA " PM",0
70  'Set I/O pin states and directions
71  OUTS = %0000000000000000 'All logic low
72  DIRS = %0000000000000111 'I/O 0,1 and 2 are output, rest are input
73  Initialize:
74  'NOTE: Date must be set only once for every power-up of DS1302 chip.
75  Day = $01 'Sunday
76  Month = $01 'January
77  Date = $28 '28th
78  Year = $12 '2012
79  Hours = $12 '12:00 PM (in 24-hour mode)
80  Minutes = $30
81  Seconds = $00
82  GOSUB SetTimeAndDate
83
84  '*intitialize servo**
85  position = 500
86
87  DO UNTIL IN15 = 1
88      GOSUB ReadRTCBurst
89      GOSUB GetSunriseSunset
90      GOSUB PrintLongDate
91      Time = (100*((Hours>>4)*10+(Hours & $0F)))
92          + ((Minutes>>4)*10+(minutes & $0F)  'converts HEX time into DEC
93      'GOSUB Print24HourTime
94      counter = 0
95      IF Time > Sunrise AND Time < Sunset THEN GOSUB Measure_Light
96                                              'measure light intensity on
97                                              'each sensor
98      GOSUB Adjust_Shelf                      'adusts light shelf if center
99                                              'sensor
100                                             'is not receiving the most
101                                             'light
102     DO
103     PAUSE 60000                             'each pause session is one min
104     counter = counter + 1
105     LOOP UNTIL counter = time_limit         'pause until the number of
106                                              minutes
107                                             'between of time shelf cycles
108                                              'is met
109 LOOP
110
111 Measure_Light:
112
113 HIGH 4
114     PAUSE 3                                 'measures left sensor
115     RCTIME 4,1,time1
116     PAUSE 1000
117
118     HIGH 5                                  'measures center sensor
119     PAUSE 3
120     RCTIME 5,1,time2
121     PAUSE 1000
122
123     HIGH 6                                  'measures right sensor
124     PAUSE 3
125     RCTIME 6,1,time3
126     PAUSE 1000
127
128     Diff1 = time2 − time1                   'measure difference between
129                                             'center and left sensor
130     Diff2 = time2 − time3                   'measure difference between
131                                             'center and right sensor
132     IF Diff1 > Light_Threshold THEN         'Compensates for negative
```

```
133 difference
134     Diff1 = 0                          'between sensor comparison
135   ENDIF
136   IF Diff2 > Light_Threshold THEN
137     Diff2 = 0
138   ENDIF
139
140   RETURN
141
142 Adjust_Shelf:
143                                        'if right sensor receives
144                                        'more light than center
145                                        'sensor rotate shelf CW
146   IF Diff1 > Diff2 THEN
147     IF Diff1 >= 20 THEN position = position + 5
148
149                                        'if left sensor receives
150                                        'more light than center
151                                        'sensor rotate shelf CCW
152   ELSEIF Diff2 > Diff1 THEN
153     IF Diff2 >= 20 THEN position = position − 5
154   ENDIF
155   PULSOUT 14, position
156   RETURN
157 '=================== DS1302 Real-Time Clock Subroutines
158 PrintLongDate:
159 'Print long date format on debug screen
160   LOOKUP Day-1,[Sun,Mon,Tue,Wed,Thu,Fri,Sat],Idx
161   GOSUB PrintIt
162   LOOKUP Month-1,[Jan,Feb,Mar,Apr,May,Jun,Jul,Aug,Sep,Oct,Nov,Dcm],Idx
163   GOSUB PrintIt
164 'NOTE: The following line prints the proper 4-digit year for the years
165 '1990 through 2089
166 RETURN
167
168 PrintShortDate:
169 'Print short date format on debug screen
170 RETURN
171 Print12HourTime:
172 'Print 12-hour time format on debug screen
173 'NOTE: The DS1302 has 12 and 24 hour time-keeping modes (bit 7 of
174 HrsReg
175 'sets 12/24 mode and bit 5 indicates AM/PM or 20+ hours). For purposes
176 'of this example, we're using 24 hour mode only, and converting it to
177 '12-hour in the next two lines below.
178 DEBUG DEC2 12-(24-(Hours.HIGHNIB*10+Hours.LOWNIB)//12),":",HEX2
179 Minutes,":",HEX2 Seconds,CR
180 LOOKUP Hours/$12,[AM,PM],Idx
181 GOSUB PrintIt
182 'GOSUB GetSunriseSunset
183 'DEBUG ? Sunrise, CR
184 'DEBUG ? Sunset, CR
185 RETURN
186
187 Print24HourTime:
188 'Print 24-hour time format on debug screen
189 'for checking set time
190 DEBUG HEX2 Hours,":",HEX2 Minutes,":",HEX2 Seconds, CR
191 RETURN
192
193 PrintIt:
194 'Prints zero (0) terminated text from EEPROM
195 READ Idx,Value 'Get next character
196 IF Value = 0 THEN Finished 'Make sure it's not a binary 0
197 DEBUG Value 'Display it on screen
198 Idx = Idx + 1
199 GOTO PrintIt
200 Finished:
201 RETURN
202
203 WriteRTCRAM:
204 'Write to DS1302 RAM Register
205 HIGH RTCCS
206 SHIFTOUT Dta, Clk, LSBFIRST, [%0\1,RTCCmd\5,%11\2,Value]
207 LOW RTCCS
208 RETURN
209
210 WriteRTC:
211 'Write to DS1302
```

```
212 HIGH RTCCS
213 SHIFTOUT Dta, Clk, LSBFIRST, [%0\1,RTCCmd\5,%10\2,Value]
214 LOW RTCCS
215 RETURN
216
217 ReadRTCBurst:
218 'Read all time-keeping registers in one burst
219 HIGH RTCCS
220 SHIFTOUT DTA, Clk, LSBFIRST, [%1\1,BrstReg\5,%10\2]
221 SHIFTIN DTA, Clk, LSBPRE, [Seconds,Minutes,Hours,Date,Month,Day,Year]
222 LOW RTCCS
223 RETURN
224
225 ReadRTCRAM:
226 'Read DS1302 RAM Register
227 HIGH RTCCS
228 SHIFTOUT DTA, Clk, LSBFIRST, [%1\1,RTCCmd\5,%11\2]
229 SHIFTIN DTA, Clk, LSBPRE, [Value]
230 LOW RTCCS
231 RETURN
232 SetTimeAndDate:
233 'Write time values into all time-keeping registers, being sure to clear
234 'the write-protect bit in CtrlReg before the write, and set the
235 'write-protect bit after the write
236 FOR Idx = 0 TO 8
237 LOOKUP Idx,[0,Seconds,Minutes,Hours,Date,Month,Day,Year,128],Value
238 LOOKUP Idx,[CtrlReg, SecReg, MinReg, HrsReg, DateReg, MonReg, DayReg,
239 YrReg, CtrlReg],RTCCmd
240 GOSUB WriteRTC
241 NEXT
242 RETURN
243 '******************SETTING SUNSET/SUNRISE************************
244 GetSunriseSunset:
245 'Converts HEX Year into Decimal form and looks up relevant months for
246 '2012
247 IF (year>>4)*10 + (year & $0F) = 12 THEN
248 'Converts HEX Month into decimal and checks if it is January
249    IF (Month>>4)*10 + (Month & $0F) = 01 THEN
250 'looks up sunrise times for January dates and assigns value
251        LOOKUP (Date>>4)*10 + (Date & $0F), [0804, 0804, 0804, 0804, 0804,
252 0804, 0804, 0804, 0803, 0803, 0803, 0803, 0802, 0802, 0802, 0801, 0801,
253               0800, 0759, 0759, 0758, 0758, 0757, 0756, 0755, 0754,
254 0754, 0753, 0752, 0751, 0750], Sunrise
255 'allows the Measure_Light subroutine to occur no earlier than 2 hours
256 before sunrise
257        sunrise = sunrise + 200
258 'looks up sunset times for January dates and assigns value
259        LOOKUP (Date>>4)*10 + (Date & $0F), [1713, 1714, 1715, 1716, 1717,
260 1718, 1719, 1720, 1721, 1722, 1723, 1724, 1725, 1726, 1727, 1728, 1730,
261               1731, 1732, 1733, 1735, 1736, 1737, 1738, 1740, 1741,
262 1742, 1743, 1745, 1746, 1747], Sunset
263 'allows the Measure_Light routine to occur no later than 2 hours before
264 sunset
265        sunset = sunset − 200
266 'Converts HEX Month into decimal and checks if it is February
267    ELSEIF (Month>>4)*10 + (Month & $0F) = 02 THEN
268 'looks up sunrise times for February dates and assigns values
269        LOOKUP (Date>>4)*10 + (Date & $0F),
270 [0749,0748,0747,0746,0745,0743,0742,0741,0740,0739,0737,0736,0735,0733,
271 0732,0731,0729,
272 0728,0726,0725,0723,0722,0720,0719,0717,0716,0714,0713,0711], Sunrise
273 'looks up sunset times for February dates and assigns values
274        LOOKUP (Date>>4)*10 + (Date & $0F),
275 [1749,1750,1751,1753,1754,1755,1756,1758,1759,1800,1802,1803,1804,1805,
276 1807,1808,1809,1811,
277 1812,1813,1814,1816,1817,1818,1819,1821,1822,1823,1824], Sunset
278    ENDIF
279 ENDIF
280 RETURN
281 'ELSEIF Year = 13 THEN    ///For brevity's sake, the additional years
282                           'have been omitted.
283    'IF Month = Jan    ///Full version has all months of all
284                        'years up to 2086 for DS1302 clock
285        'LOOKUP Date
286    'endif
287 'ENDIF
```

What is claimed is:

1. An automatically adjusting light shelf, comprising:
   a. a circuit of components configured to measure a plurality of light levels within a space, wherein the circuit of components comprises:
      i. one or more light sensors, comprising:
         1. a capacitive component; and
         2. a phototransistor in parallel with the capacitive component, wherein the plurality of light levels reaching the one or more light sensors results in measurable differences in a resistive-capacitive time constant of the one or more light sensors; and
      ii. a microcontroller, configured to measure the plurality of light levels reaching the one or more light sensors;
   b. a light shelf hingedly connected to a window assembly, the light shelf having a one and only undivided reflective surface configured to reflect a light entering the space, wherein the one or more light sensors are configured to detect the light being reflected into the space; and
   c. a rotation device configured to rotate the light shelf, wherein a rotation of the light shelf affects the light entering the space, and wherein the microcontroller is in communication with the rotation device, wherein the microcontroller is configured to measure the plurality of light levels reaching the one or more light sensors and to determine a rotation of the light shelf.

2. The automatically adjusting light shelf of claim 1, wherein the rotation device is a servomotor.

3. A method of using the automatically adjusting light shelf of claim 1, comprising the steps of:
   measuring a differential between the plurality of light levels reaching one or more light sensors within the space;
   determining a direction to rotate the light shelf to alter a lighting condition within the space; and
   rotating the light shelf so that the reflected light is optimized for a desired outcome.

4. The automatically adjusting light shelf of claim 1 wherein the circuit of components further comprises a manually operated switch connected to the microcontroller, configured to override an automatic operation.

5. The automatically adjusting light shelf of claim 1, wherein the circuit of components further comprises a clock configured to be referenced by the microcontroller for system operations.

6. The automatically adjusting light shelf of claim 1, wherein the one or more light sensors are co-planar.

7. The automatically adjusting light shelf of claim 1, further comprising a shading element below the light shelf.

8. The method of using the automatically adjusting light shelf of claim 3, further comprising the steps of:
   tracking a current time using a clock;
   programming a set of desired operational time parameters into a microcontroller;
   providing a regular updated time reading from the clock to the microcontroller; and
   referencing the current time against the set of desired operational time parameters, wherein the light shelf is rotated only if the updated time is within the set of desired operational time parameters.

9. An automatically adjusting light shelf, comprising:
   a. a circuit of components configured to measure a plurality of light levels within a space;
   b. a light shelf having a one and only undivided reflective surface configured to reflect a light entering the space, wherein the light shelf is hingedly connected to a window assembly; and
   c. a rotation device in communication with the circuit of components, the rotation device being configured to rotate the light shelf, wherein the circuit of components is configured to detect the reflected light, and wherein a rotation of the light shelf affects the light entering the space, wherein the light shelf is configured to direct the light entering the space to a surface in an upper region of the space having a reflective quality, wherein the reflective quality of the surface in the upper region of the space is configured to re-direct the light to a location within the space.

10. The automatically adjusting light shelf of claim 9, wherein the circuit of components comprises:
    a. one or more light sensors, each light sensor being configured to detect a light level; and
    b. a microcontroller configured to measure the plurality of light levels reaching the one or more light sensors and to determine a rotation of the light shelf.

11. The automatically adjusting light shelf of claim 9, further comprising a shading element below the light shelf.

12. The automatically adjusting light shelf of claim 9, wherein the rotation device is a servomotor.

13. A method of using the automatically adjusting light shelf of claim 9, comprising the steps of:
    measuring a differential between the plurality of light levels reaching one or more light sensors within the space;
    determining a direction to rotate the light shelf to alter a lighting condition within the space; and
    rotating the light shelf so that the reflected light is optimized for a desired outcome.

14. The method of using the automatically adjusting light shelf of claim 13, further comprising the steps of:
    tracking a current time using a clock;
    programming a set of desired operational time parameters into a microcontroller;
    providing a regularly updated time reading from the clock to the microcontroller; and
    referencing the current time against the set of desired operational time parameters, wherein the light shelf is rotated only if the updated time is within the set of desired operational time parameters.

15. The automatically adjusting light shelf of claim 10, wherein the circuit of components further comprises a manually operated switch connected to the microcontroller, the manually operated switch being configured to override an automatic operation of the light self.

16. The automatically light shelf of claim 10, wherein the circuit of components comprises a clock configured to be referenced by the microcontroller for system operations.

17. The automatically adjusting light shelf of claim 10, wherein the one or more light sensors are co-planar.

* * * * *